United States Patent [19]

Murphy et al.

[11] Patent Number: 5,319,527
[45] Date of Patent: Jun. 7, 1994

[54] ILLUMINATED INSTRUMENTATION DISPLAY

[75] Inventors: Morgan D. Murphy; Steven G. Skiver, both of Kokomo; David G. Beyerlein, Carmel; Kerwin C. Osman, Kokomo, all of Ind.

[73] Assignee: Delco Electronics Corporation, Kokomo, Ind.

[21] Appl. No.: 979,031

[22] Filed: Nov. 20, 1992

[51] Int. Cl.⁵ ............................................ G01D 11/28
[52] U.S. Cl. ...................................... 362/26; 362/32; 116/288; 116/328; 336/120
[58] Field of Search ............... 362/26, 32; 116/286, 116/287, 288, 328, DIG. 6, DIG. 36; 336/120, 123

[56] References Cited

U.S. PATENT DOCUMENTS

| | | | |
|---|---|---|---|
| 3,776,176 | 12/1973 | Doyle | 116/288 |
| 4,163,428 | 8/1979 | Ishikawa | 116/288 |
| 4,274,358 | 6/1981 | Nakamura et al. | 116/288 |
| 4,321,572 | 3/1982 | Studer et al. | 336/120 |
| 4,404,559 | 9/1983 | Renner et al. | 336/123 |
| 4,860,170 | 8/1989 | Sakakibara et al. | 362/26 |
| 4,959,759 | 9/1990 | Kohler | 362/26 |
| 5,050,045 | 9/1991 | Kato et al. | 362/23 |
| 5,078,079 | 1/1992 | Ohta et al. | 116/288 |
| 5,142,453 | 8/1992 | Ohta et al. | 362/32 |
| 5,143,434 | 9/1992 | Otha et al. | 116/286 |

FOREIGN PATENT DOCUMENTS 92-219596/27  4/1992  Fed. Rep. of Germany.
2668590  10/1990  France.

*Primary Examiner*—Richard A. Bertsch
*Assistant Examiner*—Michael I. Kocharov
*Attorney, Agent, or Firm*—Anthony Luke Simon; Jimmy L. Funke

[57] ABSTRACT

An illuminated apparatus comprises a fixedly mounted air core gage having a spindle which rotates in response to signals provided to the air core gage, a first coil fixably mounted with respect to the air core gage having a first axis coaxial with the spindle, a power source coupled to the first coil, providing power to the first coil, which responsively generates a magnetic flux, a pointer body mounted to the spindle and rotating in response to rotation of the gage spindle, a second coil mounted to the pointer body adjacent to the primary coil, a light source mounted on the pointer body, coupled to and receiving the electric current from the second coil, the electric current illuminating the light source, and a light pipe pointer arm receiving light from the light source and emitting light out of an exit surface to appear as an illuminated pointer to an observer.

8 Claims, 7 Drawing Sheets

U.S. Patent  June 7, 1994  Sheet 1 of 7  5,319,527
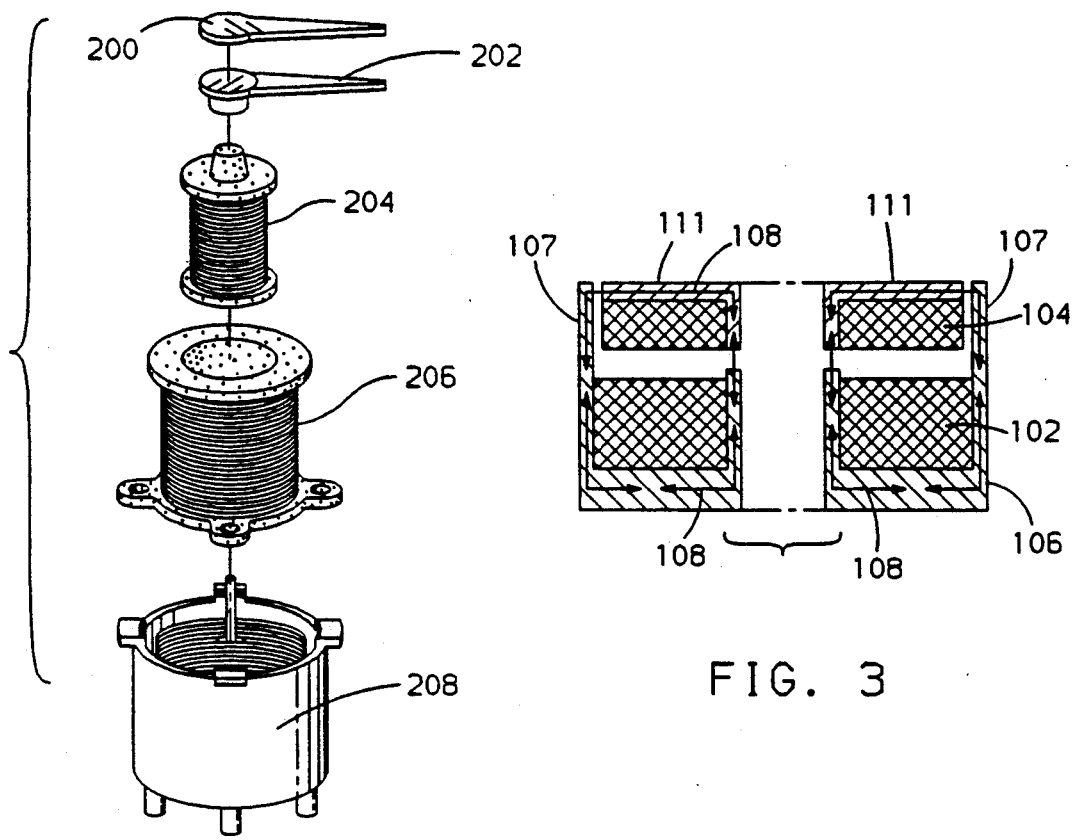
FIG. 3
PRIOR ART
FIG. 1
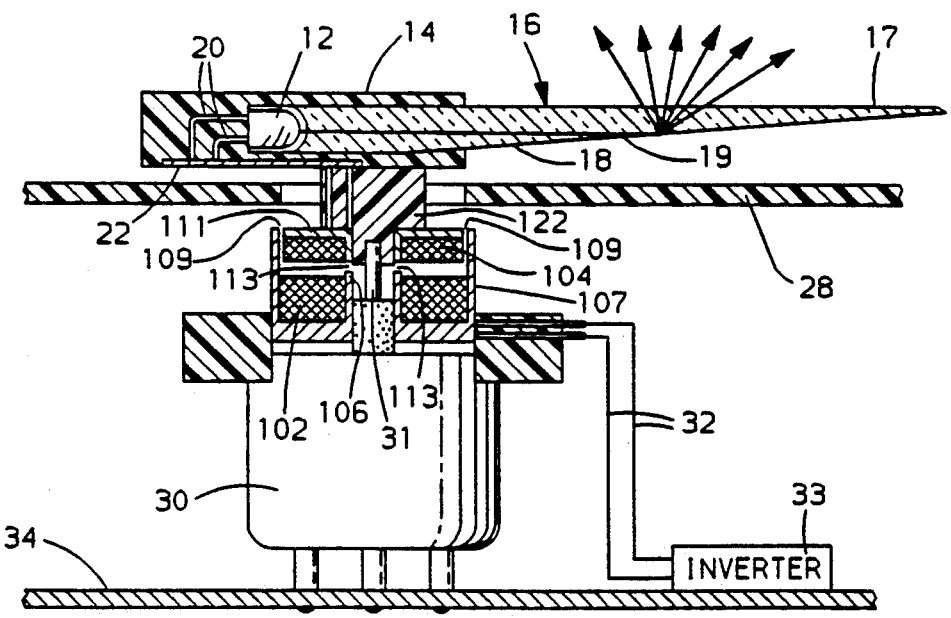
FIG. 2

ILLUMINATED INSTRUMENTATION DISPLAY

This invention pertains to instrumentation displays and, more particularly, to illuminated instrumentation displays.

BACKGROUND OF THE INVENTION

Many instrumentation displays include gages and/or dials with rotatably mounted pointers. In many instances, designers desire the pointers to be illuminated. One known method for illuminating pointers is to construct the pointer out of light piping material that receives light from a fixed light source, remote from the pointer, possibly through additional light piping material.

Another known method of providing an illuminated pointer is to provide one or more light sources on the pointer, which light sources are connected to a power source through flexible contacts that allow the pointer to rotate while maintaining power supply to the light source on the pointer.

Still another attempt at providing an illuminated pointer appears in FIG. 1. The pointer 200 is back-lit by an electroluminescent lamp 202. The pointer 200 and the electroluminescent lamp 202 are connected to coil 204 which is mounted to the spindle of gage 208 so that as gage 208 causes its rotor (not shown) to rotate, the coil 204, electroluminescent lamp 202 and pointer 200 also rotate. When power is applied to primary coil 206, it is coupled to secondary coil 204, which rotates within primary coil 206, and which powers lamp 202.

The apparatus shown in FIG. 1 was disclosed in an unworkable implementation in *Research Disclosure*, No. 28985, May 1988. Furthermore, even if the apparatus shown were made workable, the brightness of pointer 200 would be limited because of the limited brightness of electroluminescent lamps.

SUMMARY OF THE PRESENT INVENTION

This invention provides an illuminated pointer for instrumentation displays. The pointer of this invention is brightly lit by a light source mounted on the pointer, without requiring wire connectors to a remote power source. Advantageously, the apparatus of this invention provides an illuminated pointer that eliminates the necessity of piping light to the pointer. Advantageously, the apparatus of this invention provides a pointer brightly lit by an LED light source. Advantageously, the apparatus of this invention provides a pointer brightly lit by an incandescent light source. Advantageously, the apparatus of this invention provides a brightly lit illuminated pointer weighing less than 4 grams.

Structurally, the apparatus of this invention comprises a gauge having a rotatable spindle, a first coil fixedly mounted to the gauge, a central opening in the first coil through which the spindle protrudes, and a pointer attached to the rotatable spindle and having a body to which is attached a second coil and a light source for illuminating the pointer. The second coil rotates with the pointer and shaft and is placed in close proximity to the first coil. A flux transfer means effects an efficient transfer of flux from the first coil to the second coil. The light source is coupled to the second coil and lit, thereby, in response to an alternating current applied to the first coil, wherein the first coil effectively has at least 0.1 amp-turns. The pointer has a light transmissive arm for receiving light from the light source. The light exits the pointer from an exit surface of the pointer wherein the pointer appears brightly lit to an observer.

This invention, along with various embodiments thereof, is set forth in more detail below.

BRIEF DESCRIPTION OF THE DRAWINGS

FIG. 1 illustrates a prior art electroluminescent pointer.

FIG. 2 illustrates an illuminated pointer apparatus of this invention.

FIG. 3 illustrates an example efficient flux transfer according to this invention.

DETAILED DESCRIPTION OF THE INVENTION

EXAMPLE 1

Figure 4:
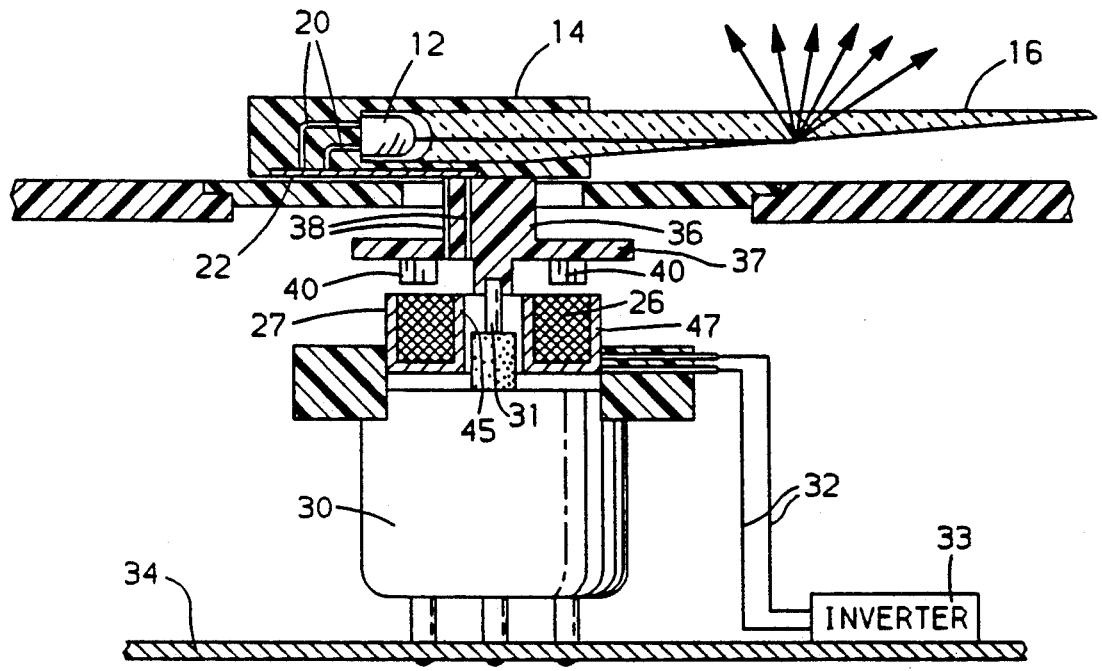
FIG. 4 illustrates another example implementation of this invention.

Referring to FIG. 2, the apparatus shown comprises gauge 30, spindle 31, first coil 102, second coil 104, pointer 16, light source 12 and power source 33. The gauge 30 comprises any suitable gauge such as an air core gauge of a type well known to those skilled in the art. The gauge 30 is attached to circuit board 34 and includes a rotor (not shown), which rotates in response to power applied to the gauge, causing rotation of spindle 31. Spindle 31 protrudes through the center of first coil 102 and is attached to the body 122 of pointer 16, causing pointer 16 to rotate with the rotation of spindle 31. Second coil 104 is attached to the pointer body 122 and rotates with the pointer 16.

Pointer 16 includes light source 12, coupled to coil 104 through leads 20 and circuit board 22. The light source 12 is mounted to the pointer body 122 and covered by opaque plastic cap 14 so as not to be directly visible to a viewer. The pointer 16 includes pointer arm 18 comprising a light piping material of a type well known to those skilled in the art. Pointer arm 18 has a rear reflective surface 19 which reflects light from light source 12 out of exit surface 17 as shown.

First coil 102 is wound around core 106, which is a first efficient flux transfer device comprising a ferrous material or any other type of efficient flux transferring material. The outer cylindrical edge 107 of core 106 is raised forming a cylindrical area in which coil 104 is mounted. The axis of coil 104 is collinear with the axis of coil 102 and coil 104 freely rotates within core 106 with the rotation of pointer 16.

Coil 104 is wound around core 111, which is a second efficient flux transfer device of similar material to the first. Excluding the air gaps 109 and 113, cores 106 and 111 form a substantially closed cylindrical donut-shaped annular passage containing coils 102 and 104 as shown.

Power source 33 comprises any type of suitable alternating current power source, such as a standard inverter circuit of a type well known to those skilled in the art. Power source 33 provides power in the form of an alternating current to first coil 102 via lines 32. First coil 102 creates an alternating magnetic flux, which core 106 efficiently transfers to core 111.

Coil 104 receives power coupled through core 111 and generates an alternating current voltage supplied to circuit board 22 and to light source 12 via lines 20. In response to the voltage supplied via lines 20, light source 12 illuminates, sending light through light pipe pointer arm 18. In response, pointer arm 18 appears illuminated to an observer. It has been found that a minimum of 0.1 amp-turns is required in coil 102 to couple enough power to coil 104 to illuminate light source 12.

Referring to FIG. 3, a cross section of the substantially closed cylindrical donut within which coils 102 and 104 are mounted is shown. Within the cores 106 and 111 is illustrated flux lines 108, which travel a substantially closed path as shown, providing for the efficient transfer of flux between the coils 102 and 104.

Because of the symmetrical design of the coils 102 and 104 and cores 106 and 111, the flux path does not change shape and is symmetrical for all positions of rotation. Consequently, when power is provided to the first coil 102, light source 12 illuminates providing a brightly lit pointer 16 that is evenly lit regardless of the rotational position of the pointer 16.

Pointer 16 is viewed in connection with typical graphics from graphics plate 28.

EXAMPLE 2

Referring to FIG. 4, the implementation of this invention shown varies from the first example with pointer body 36, coil 26, core 27 and surface mounted inductors 40. Coil 26 is similar to coil 102 in FIG. 2 except for core 27, which, as shown, does not have a raised outer periphery.

The pointer body 36 has a disk-like portion 37 to which are mounted two surface mounted inductors 40. Each surface mounted inductor 40 is a small inductor comprising a coil wound around a small core and encapsulated in a ceramic material. Surface mounted inductors typically have length, width and depth measurements on the order of a few millimeters each and weighing typically on the order of 0.3 grams.

Surface mounted inductors 40 are mounted to pointer body 36 so that they are diametrically opposed with respect to spindle 31. Surface mounted inductors 40 are oriented so that their coils have substantially collinear axes and so that the axes of their coils are perpendicular to the axis of spindle 31. The extended axes of surface mounted inductors 40 intersect spindle 31.

As spindle 31 rotates, pointer body 36 rotates with surface mounted inductors 40, which, at all rotational positions, are each above the windings of coil 26 and each between the inner and outer peripheries 45, 47 of core 27.

Even though surface mounted inductors 40 are miniature in size, they couple sufficient flux from coil 26 to illuminate light source 12. A single surface mounted inductor may be used to light one or two LEDs. In this case, one of the surface mounted inductors 40 may be removed. If light source 12 is an incandescent light source, two surface mounted inductors, as shown, may be required. It has been found that coil 26 requires at least 0.15 amp-turns to couple enough energy to illuminate light source 12 for the implementation shown in FIG. 4.

When light source 12 is a single LED, it self-rectifies the AC wave. When two LEDs are used as light source 12, they are coupled so that one rectifies each half of the wave. It is noted that use of an incandescent bulb with an AC signal source, such as with coils 104, 40 and 40', provides increased life span for the incandescent bulb as incandescent bulbs have increased life span when powered through AC signals as compared to when powered with DC signals.

Figure 5:
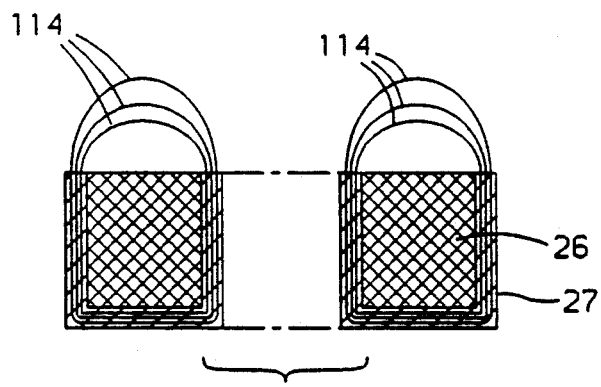
FIGS. 5, 6, 7 and 8 illustrate the operation of this invention.
Figure 6:
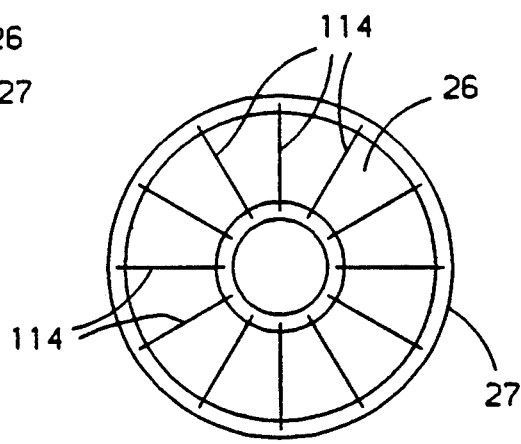
Figure 7:
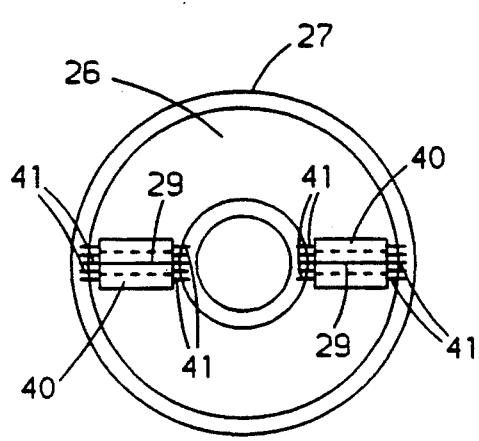
Figure 8:
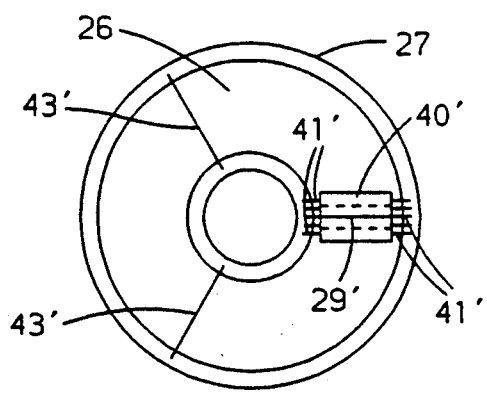

Referring now to FIGS. 5-8, the behavior of flux paths used to transfer energy according to this invention are shown. FIGS. 5 and 6 illustrate flux paths 114 for a coil 26 mounted in core 27. FIGS. 7 and 8 illustrate the effect of the surface mounted inductors 40 on the flux paths, now indicated by references 41. With the cores of surface mounted inductors 40 aligned along axes 29, as shown, a substantial portion of the magnetic flux takes the path of least resistance through the cores of surface mounted inductors 40, as illustrated by references 41. FIG. 8 illustrates this effect with a single surface mounted inductor 40', having axis 29' and with flux paths 41' and 43'.

Figure 9:
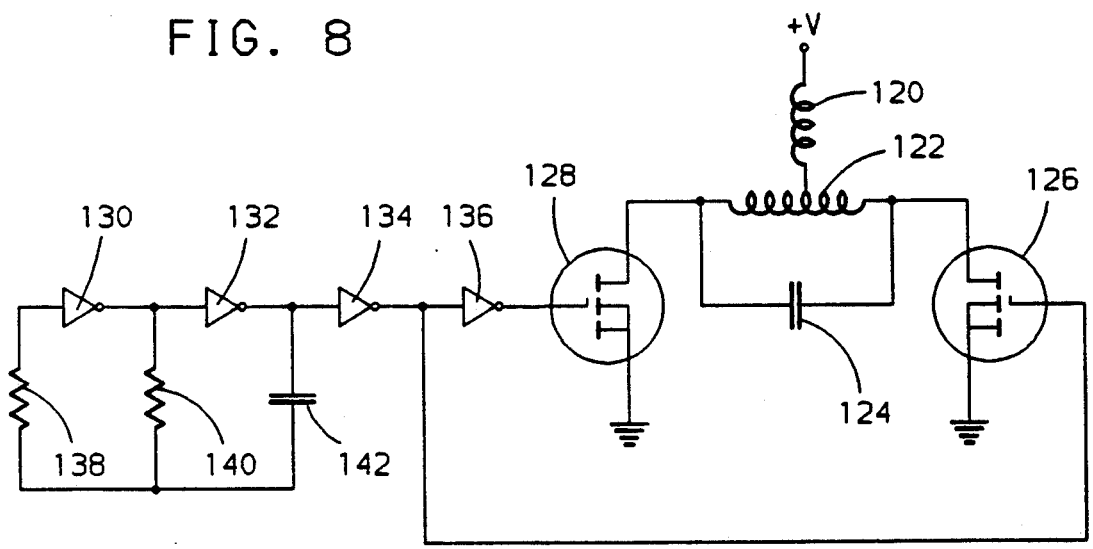
FIG. 9 is an example inverter circuit for use with this invention.

Referring now to FIG. 9, the example inverter comprising inductor 120, primary coil 122, capacitors 124 and 142, resistors 138 and 140, inverters 130, 132, 134 and 136 and FETs 128 and 126, is of a type well known to those skilled in the art. The inverter shown is well suited for providing alternating current to the primary coil 122, which corresponds to any of the primary coils (102, 26, etc.) or first coils illustrated in any of the embodiments set forth herein.

Figure 10:
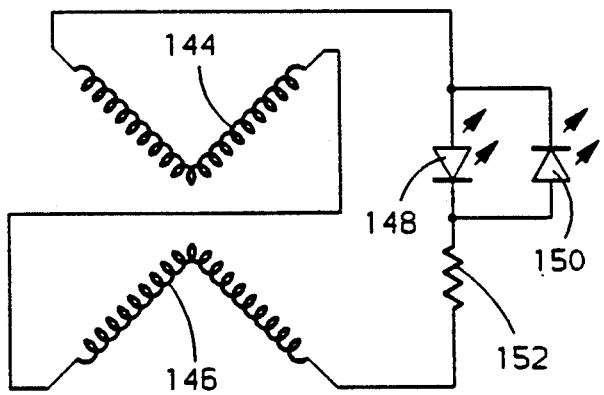
FIGS. 10 and 11 are example pointer circuits according to this invention.

FIG. 10 illustrates an example circuit using two secondary coils 144 and 146, which may be the coils of the two surface mounted inductors 40, shown in FIG. 4 and FIG. 7, that capture electrical energy for LEDs 150 and 148. Although two LEDs are shown, one may be used if desired. Also if desired, LEDs 148 and 150 may be replaced by an incandescent bulb. Resistor 152 is implemented to regulate the current through the light sources.

Figure 11:
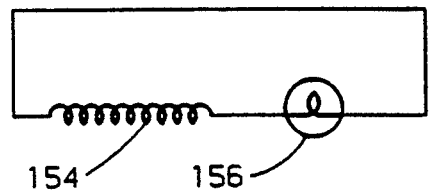

FIG. 11 shows an alternative implementation using only one coil and an incandescent bulb 156. The implementation shown in FIG. 11 is well suited for the display type shown in FIGS. 2 and 3.

Figure 12:
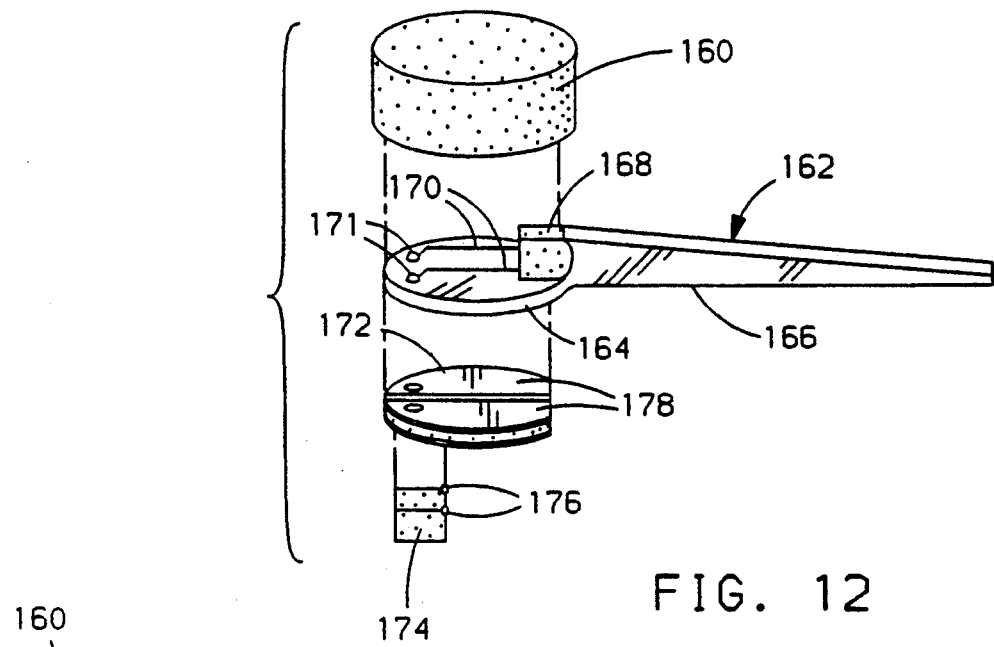
FIGS. 12 and 13 illustrate a preferred pointer implementation according to this invention.

Referring now to FIG. 12, a preferred embodiment of this invention is shown. In the figure, an opaque plastic cap 160 shown covers part of a light pipe piece 162, which single piece comprises a base 164 and a light pipe pointer arm 166. On base 164 is a light source 168 positioned to supply light to the light pipe pointer arm 166. Two leads 170 from light source 168 travel through holes 171 to a small circuit board 172 and are attached thereon by any suitable means including soldering. The small circuit board 172 has electrical paths 178. Attached to the underside of the circuit board 172 is surface mounted inductor 174 which has its coil connectors 176 electrically connected to the two leads of light source 168, i.e., through a circuit trace on the circuit board such as traces 178.

Figure 13:
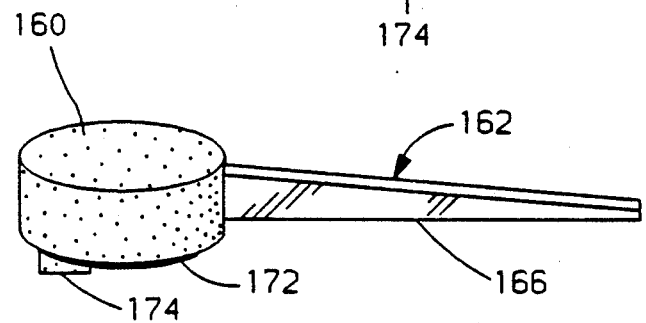

FIG. 13 shows the lit pointer of FIG. 12 assembled into a small compact unit, examples of which have been constructed to weigh just 3.5 grams. At 3.5 grams, the pointer 162 shown in FIGS. 12 and 13, is small and light enough to replace most currently used pointers, both illuminated and non-illuminated. In the examples shown in FIGS. 12 and 13, a second surface mounted inductor may be added in the manner shown in FIG. 7 to provide even more power to the light source 168.

EXAMPLE 3

Figure 14:
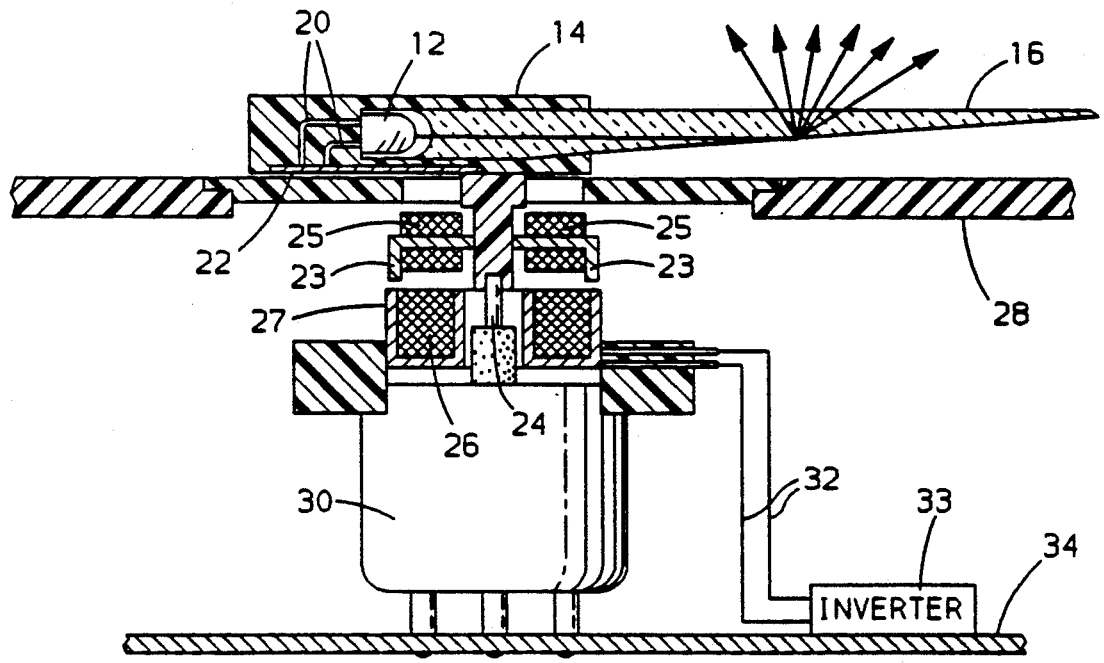
FIGS. 14 and 15 illustrate other example implementations of this invention.

Referring to FIG. 14, the implementation of this invention shown includes two secondary coils 25 wound around U-shaped flux guide 23. The flux guide 23 provides symmetrical coupling of the primary coil 26 to secondary coils 25 regardless of the rotational position of the pointer 16.

EXAMPLE 4

Figure 15:
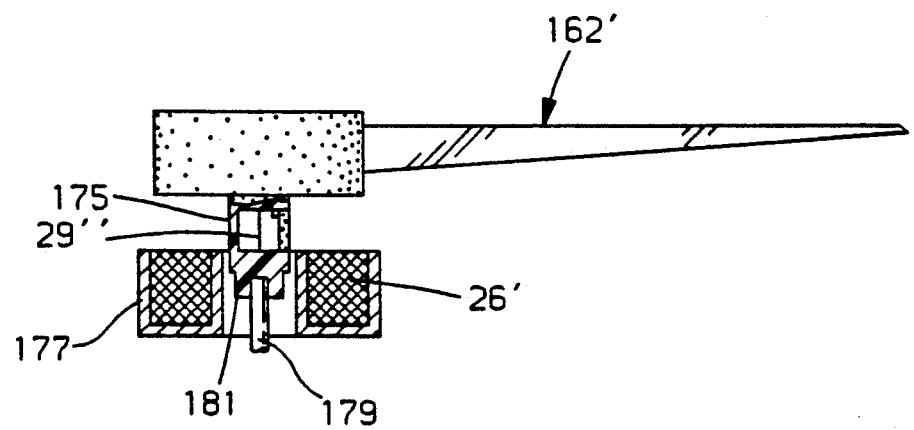

Referring now to FIG. 15, pointer 162, is similar to pointer 162 shown in FIGS. 12 and 13, with surface mounted inductor 175 mounted on the axis of rotation of pointer 162', with its axis 29'' aligned collinearly with the axis of spindle 179 as shown. Surface mounted inductor 175 is mounted in a plastic connector 181, to which spindle 179 is staked. Coil 26' is wound around plastic bobbin 177. Since surface mounted inductor 175 is coaxial with and in close proximity to coil 26', the core of surface mounted inductor 175 acts as a flux guide, through which flux generated by coil 26' is coupled to surface mounted inductor 175.

EXAMPLE 5

Figure 16:
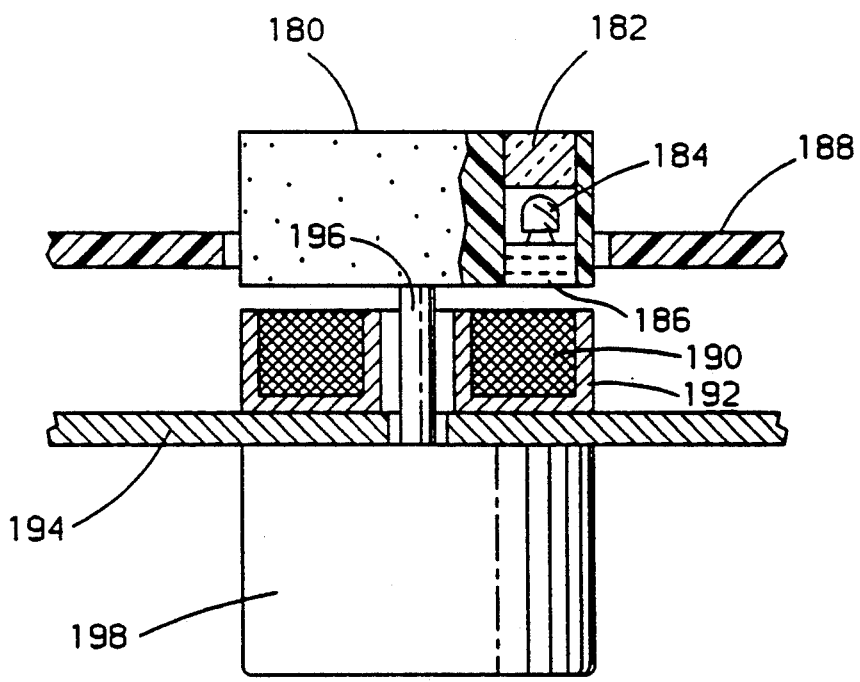
FIG. 16 illustrates a lit knob/switch according to this invention.

Referring now to FIG. 16, this invention may be used not only in illuminated pointers, but in illuminated switches and knobs. In FIG. 16, rotatable knob 180 is rotated by an operator, which rotates shaft 196, controlling rotary switch (or potentiometer) 198. Rotary switch 198 may be used for on/off and/or volume control of audio or video equipment, etc.

Coil 190 is wound around core 192 and coupled to an alternating current voltage supply (not shown). Coil 192 is mounted to the opposite side of circuit board 194 from switch 198. Surface mounted inductor 186 is mounted within knob 180 above coil 190, as shown, with its axis perpendicular to the axis of shaft 196 along a line intersecting the axis of shaft 196.

Surface mounted inductor 186 is coupled to a light source 184, which emits light that is diffused through diffuser 182 (optional). The apparatus shown provides a rotatable light source within the knob 180 without requiring any sort of connectors and allowing infinite rotational motion of knob 180.

The knob 180 is mounted within housing 188.

EXAMPLE 6

It is known to use a lit pointer comprising several surface mounted LEDs (i.e., 30 LEDs) mounted along the pointer arm with conventional power supply techniques. This invention can be used to provide power to pointer arms including several surface mounted LEDs. Additionally, any other type of light source that requires AC or DC power can be used according to this invention.

EXAMPLE 7

Figure 17:
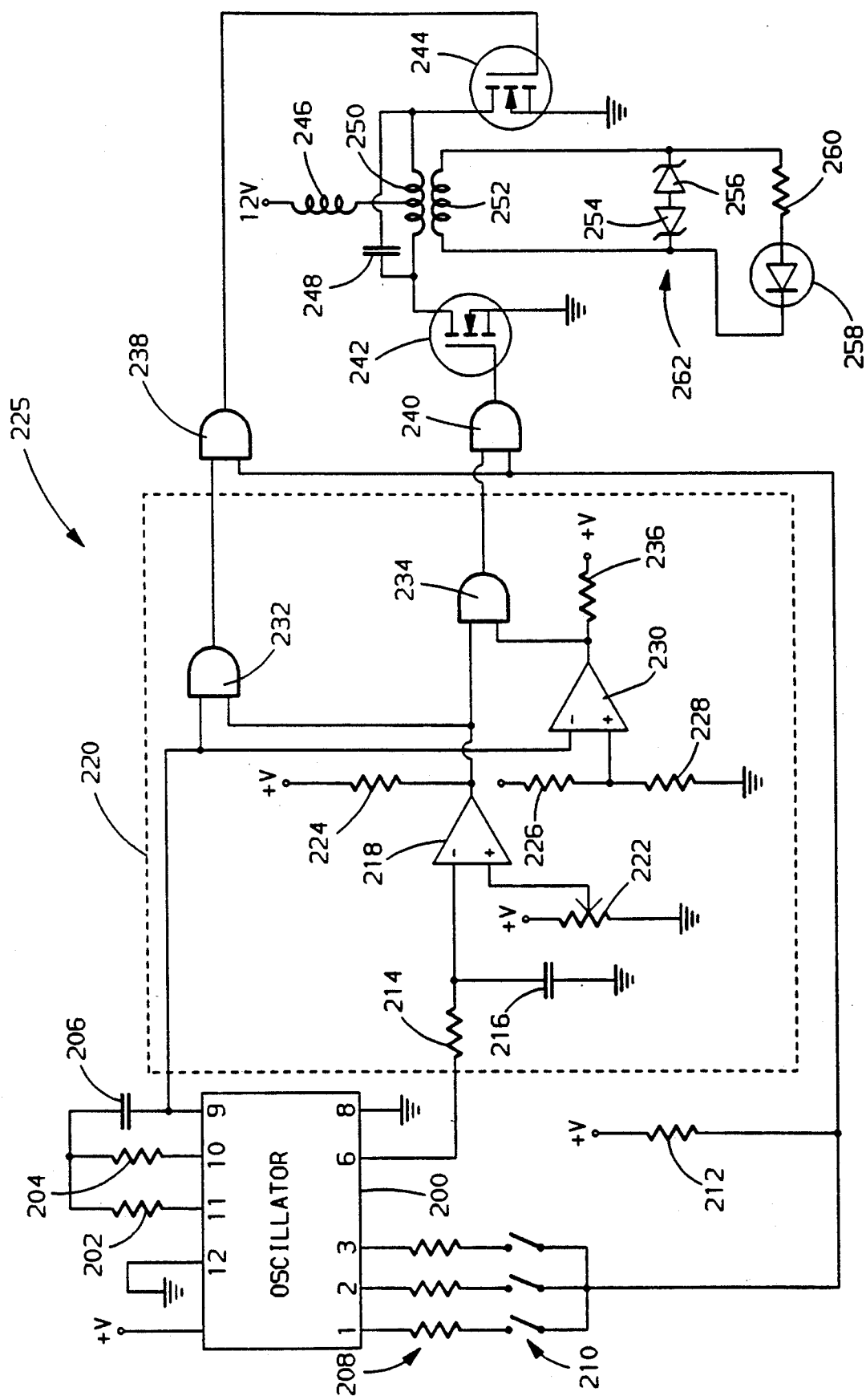
FIG. 17 illustrates an implementation of this invention for providing a flashing pointer.

Referring to FIG. 17, the implementation of this invention shown includes circuit 225 for driving primary coil 250 with pulses of AC, so that circuit 262 on the pointer receives the pulses of power and provides a flashing light source 258. More particularly, integrated circuit 200 is a standard oscillator divider circuit, such as Motorola TM 4060, which provides an oscillator output at pin 9 whose frequency is control by resistors 202 and 204 and capacitor 206. Integrated circuit 200 also provides outputs at pins 1, 2, and 3 at frequencies that are divisions of the output frequency at pin 9.

The oscillator output at pin 9 is input to one side of AND gate 232 in dimmer circuit 220. The output at pin 9 is also coupled to the inverting input of amplifier 230, whose non-inverting input is biased by resistors 226 and 228. Amplifier 230 inverts the signal on line 9 and provides the inverted signal to one input of AND gate 234. The output of amplifier 230 is pulled normally high by resistor 236 coupled to the supply voltage.

The output of pin 6 is a square wave signal, which is passed through a low pass filter including resistor 214 and capacitor 216 to form a triangular wave that is coupled to the non-inverting input of amplifier 218. The triangle wave on the non-inverting input of amplifier 218 is compared to a D.C. voltage level set by potentiometer 222 to generate a variable pulse width signal at the output of amplifier 218. The output of amplifier 218 is normally pulled high by resistor 224 and is fed to AND gates 232 and 234 to provide pulse bursts, with dimming controlled by the setting of potentiometer 222.

The outputs of AND gates 232 and 234 are coupled to the first inputs of AND gates 238 and 240 as shown. The second inputs of AND gates 238 and 240 are coupled to the divider outputs at pins 1, 2 and 3 of the oscillator integrated circuit 200 by resistors 208 and switches 210. Switches 210 control the pulse rate of the signals output from the AND gates 238 and 240.

The output of AND gates 238 and 240 are coupled to the steered inverted comprising FETs 242 and 244, inductor 246, capacitor 248 and primary coil 250, providing pulsed sign-wave current to coil 250. Coil 250 generally corresponds to the primary coil such as coil 102 in FIG. 2, or any other primary coil illustrated in this invention.

The power is coupled to coil 252 which may be any of the secondary coils illustrated above, including coil 104 in FIG. 2 and surface mounted inductors 40 in FIG. 4. Coil 252, zener diodes 254 and 256, resistor 260 and light source 258 are all mounted on the illuminated pointer and easily fit on a small circuit board mounted to the pointer body.

As shown, light source 258 is an LED that responsively flashes at the rate controlled by the selected switch 210 and the oscillator base frequency. If desired, LED 258 can be replaced with an incandescent lamp that will also flash. When light source 258 is an incandescent bulb, coil 250 requires more amp-turns than when light source 258 is an LED.

EXAMPLE 8

Figure 18:
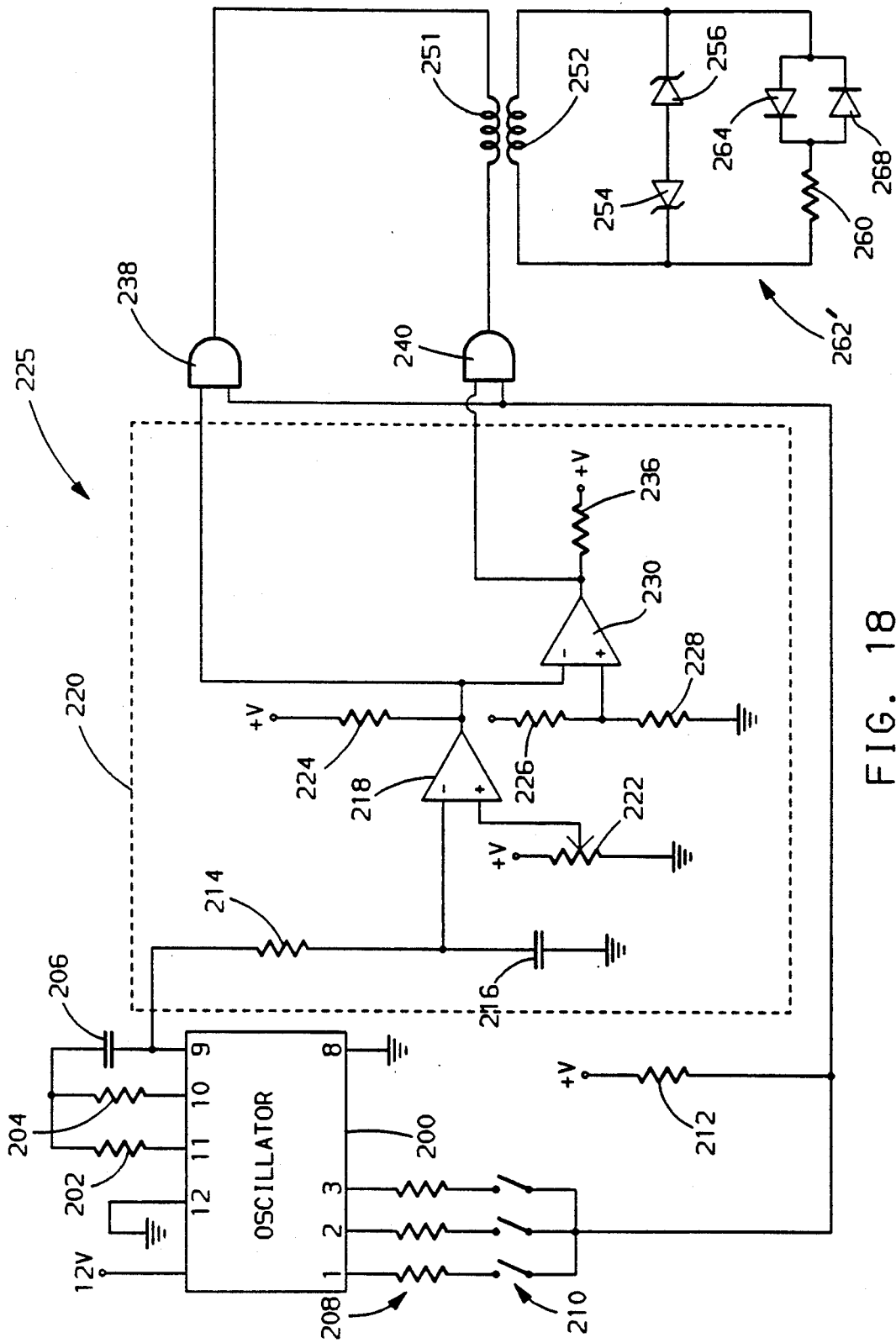
FIG. 18 illustrates an implementation of this invention for providing a pointer that varies in color.

Referring now to FIG. 18, the circuit shown is similar to that shown in FIG. 17 with the steered inverter removed and replaced with coil 251 so that coil 251 is driven with a square-wave whose duty cycle is controlled by potentiometer 222. AND gates 232 and 234 are removed and resistor 214 is coupled to pin 9 of oscillator 200 as shown. Additionally, the circuit on the illuminated pointer (or knob) is altered as shown by circuit 262'. Light source 258 is replaced with LEDs 264 and 268, coupled in opposite directions as shown.

In the circuit shown, LEDs 264 and 268 emit light in response to current and duty cycle provided by the pointer circuit 262'. Thus, by controlling the duty cycle of each square-wave provided to primary coil 251, LEDs 264 and 268 may be selectively lit. Advantageously, according to this invention therefore, LEDs 264 and 268 may be different color LEDs so that the LEDs 264 and 268 can be illuminated independently or together providing variations in the color of the pointer.

More particularly, when the square-wave signal provided to coil 251 has a 50% duty cycle, both LEDs 264 and 268 are illuminated providing an illuminated pointer in the color of the combination of the two LEDs. For example, if LED 264 is green and LED 268 is red, the mixed color is yellow during a 50% duty cycle. When the duty cycle to coil 251 is reduced to 25%, looking at the output of AND gate 238, only LED 264 is illuminated even though low current still flows through LED 268. In this instance, LED 264 makes the illuminated pointer appear green. When the duty cycle at the output of AND gate 238 changes to 75%, LED 268 is illuminated and LED 264 is not illuminated even though low current still flows through LED 264. In this instance, the illuminated pointer appears red.

Furthermore, color blending may be used to provide an infinite amount of variation in the color of the pointer between green and red. By varying the duty cycle of the signal at coil 251 between maximum and minimum duty cycles, the illuminated pointer varies from green to green mixed with a little red, to yellow, to red mixed with a little green, to red.

The duty cycle values given above are example values and may vary from implementation to implementation with changes in the system, which may be affected by the amp-turns on coil 251 and the characteristics of the LEDs 264 and 268.

In the above implementations, an air core gauge is used as the means for applying motive force to rotate the spindle, which in turn rotates the illuminated pointer (the rotatable member). In place of an air core gauge, any other suitable means for applying motive force may be implemented, including a stepper motor or other type of motor.

The above implementations are example implementations of this invention. Various modifications to this invention may occur to those skilled in the art and will fall within the scope of this invention as set forth below.

The embodiments of the invention in which an exclusive property or privilege is claimed are defined as follows:

1. An apparatus comprising:
   a first coil fixedly mounted to a support;
   an AC power source coupled and supplying power to the first coil;
   a spindle having an axis, the spindle rotatably mounted with respect to the first coil;
   a second coil fixedly mounted with respect to the spindle, the second coil rotating with rotation of the spindle, with respect to the first coil, about the spindle axis;
   a light source, fixedly mounted with respect to the spindle and the second coil rotating with rotation of the spindle with respect to the first coil, about the spindle axis, the light source coupled to the second coil, wherein
   the AC power source supplies power to the first coil, which power is coupled to the second coil through magnetic flux, wherein the second coil provides power to the light source, which responsively illuminates.

2. The apparatus set forth in claim 1, including flux transfer means for coupling the magnetic flux from the first coil to the second coil, the flux transfer means comprising first and second flux cores forming a substantially closed cylinder containing the first and second coils.

3. The apparatus set forth in claim 1, wherein the second coil is mounted coaxially with respect to the first coil.

4. The apparatus set forth in claim 1, wherein the second coil comprises at least one surface mounted inductor having a magnetic axis which is perpendicular to a magnetic axis of the first coil.

5. The apparatus set forth in claim 4, wherein the second coil comprises two surface mounted inductors diametrically opposed about the spindle.

6. The apparatus set forth in claim 1, including a light pipe element mounted on said spindle for rotation therewith, said element receiving light from said light source and emitting light out of an exit surface thereof.

7. The apparatus set forth in claim 6, wherein the light pipe element is a pointer.

8. The apparatus set forth in claim 6, wherein the light pipe element is a knob.

* * * * *